US012762794B2

(12) United States Patent
Ye et al.

(10) Patent No.: US 12,762,794 B2
(45) Date of Patent: Oct. 13, 2026

(54) ENERGY AND COMPUTE OPTIMIZATION OF REAL TIME IMAGE CONVERTER USING 2D TO 3D RENDERING

(71) Applicant: DELL PRODUCTS L.P., Round Rock, TX (US)

(72) Inventors: Qing Ye, Hopkinton, MA (US); Zhisong Liu, Lahti (FI); Rowland Shaw, Chester, NH (US)

(73) Assignee: Dell Products L.P., Round Rock, TX (US)

( * ) Notice: Subject to any disclaimer, the term of this patent is extended or adjusted under 35 U.S.C. 154(b) by 174 days.

(21) Appl. No.: 18/759,475

(22) Filed: Jun. 28, 2024

(65) Prior Publication Data

US 2026/0004517 A1 Jan. 1, 2026

(51) Int. Cl.
*G06T 17/00* (2006.01)
*G06T 15/04* (2011.01)
*G06V 10/25* (2022.01)

(52) U.S. Cl.
CPC .............. *G06T 17/00* (2013.01); *G06T 15/04* (2013.01); *G06V 10/25* (2022.01)

(58) Field of Classification Search
CPC ...................................................... G06T 17/00
See application file for complete search history.

(56) References Cited

U.S. PATENT DOCUMENTS

| | | | | |
|---|---|---|---|---|
| 7,113,191 | B2 | 9/2006 | Lake et al. | |
| 10,140,544 | B1 * | 11/2018 | Zhao | G06N 3/084 |
| 10,360,438 | B2 | 7/2019 | Mazula | |
| 2013/0121551 | A1 * | 5/2013 | Poulsen | G06T 12/30 382/131 |
| 2020/0043227 | A1 * | 2/2020 | Chapman | G06V 10/82 |
| 2024/0029354 | A1 * | 1/2024 | Cheng | G06V 10/7715 |

* cited by examiner

*Primary Examiner* — William A Beutel
(74) *Attorney, Agent, or Firm* — Larson Newman, LLP

(57) ABSTRACT

An image conversion device includes an image capture device and a renderer. The image capture device captures a plurality of two-dimensional (2D) images. The renderer receives the 2D images and renders a 3D model of an object captured in the 2D images. In rendering the 3D model, the renderer first renders a binary edge map of the object, and next models textures for the 3D model.

16 Claims, 6 Drawing Sheets

300

| Method | PSNR (dB)↑ | SSIM↑ | Frame per second (FPS)↑ | GPU memory (MB)↓ | FLOPs ↓ | GPUs (Nvidia) |
|---|---|---|---|---|---|---|
| NeRF | 30.23 | 0.946 | 0.04 | 5 | 1056k | V100 |
| JAXNeRF | 30.55 | 0.952 | 0.01 | 12 | 1056k | RTX 2080 |
| NeRF-SH | 31.71 | 0.958 | 168 | 1900 | 0 | V100 |
| KiloNeRF | 31.00 | 0.920 | 50 | 160 | 12k | GTX 1080 Ti |
| AutoInt | 25.55 | 0.911 | 0.6 | 5 | 110k | V100 |
| DIVeR32 | 32.12 | 0.958 | 47 | 68 | 10k | GTX 1080 Ti |
| FastNeRF (no-cache) | 29.16 | 0.936 | 0.03 | 28 | 1023k | RTX 3090 |
| FastNeRF (1K Cache) | 29.97 | 0.941 | 172 | 16200 | 2.3k | RTX 3090 |
| SqueezeNeRF (no-cache) | 29.59 | 0.931 | 0.02 | 11 | 997k | Nvidia V100 |
| SqueezeNeRF | 29.61 | 0.921 | 165 | 155 | 3.1k | Nvidia V100 |
| Instant-NGP | 33.18 | 0.962 | 6.7 | 3072 | - | RTX 3090 |

ENERGY AND COMPUTE OPTIMIZATION OF REAL TIME IMAGE CONVERTER USING 2D TO 3D RENDERING

FIELD OF THE DISCLOSURE

Embodiments of the present invention generally relate to image generations. More particularly, at least some embodiments of the invention relate to systems, hardware, software, computer-readable media, and methods, for real time rendering of two dimensional images into a three-dimensional image physical structure inspection and maintenance.

BACKGROUND

Various approaches have been devised for digital image conversion. For example, Matterport transforms a photographs of a space into BIM (building information modeling) or CAD (computer aided drafting) files to reconstruct a digital three-dimensional (3D) space for viewing or other purposes. Thus, the reconstructed 3D model may be an approximation, such as at BIM LoD (Level of Development) 200-300, of the space that was photographed. However, such a model only indicates the structural configuration of the space from a design point of view, rather than reflecting real world condition such as cracked surfaces, deformations, deteriorating portions, and other conditions. It is noted here that LOD is an industry standard that defines various levels of refinement at which the 3D geometry of the building model can be rendered, and is used as a measure of the service level required.

Approaches such as those just described may be relatively time-consuming. For example, file conversion and BIM reconstruction services typically take about 24 hours, to as long as a few days, depending on considerations such as the size of the space that was photographed.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
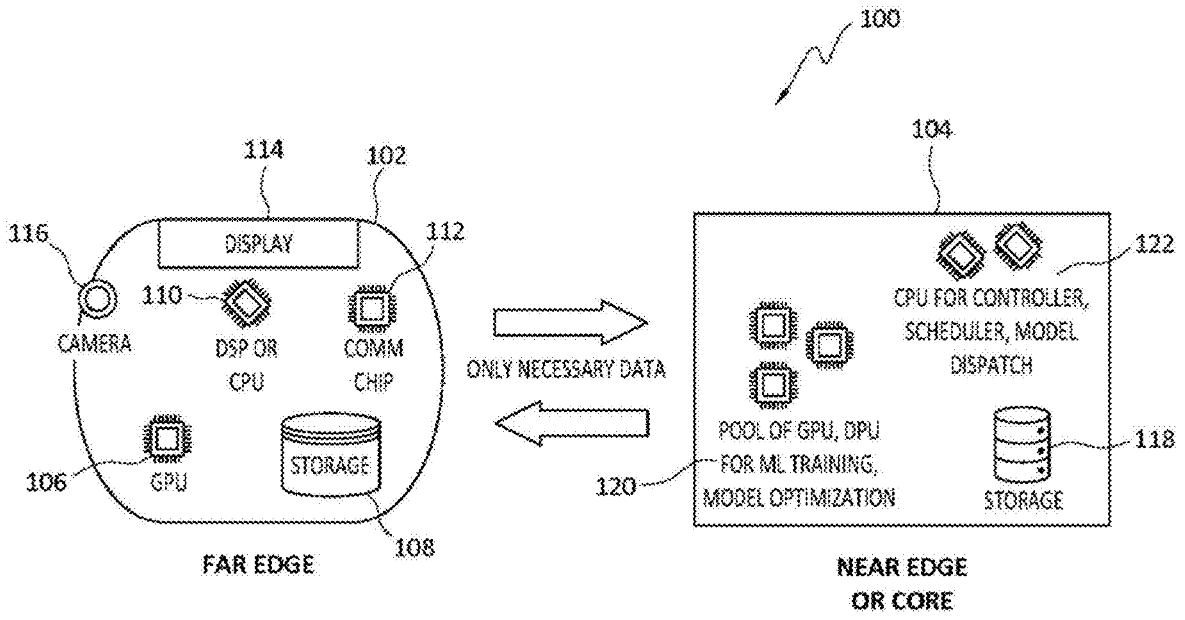
FIG. 1 discloses aspects of an example architecture, according to an embodiment.

Embodiments of the present invention generally relate to image generations. More particularly, at least some embodiments of the invention relate to systems, hardware, software, computer-readable media, and methods, for real time rendering of two dimensional images into a three-dimensional image.

One embodiment of the invention comprises a method that uses a real time image converter, which may be located in a far edge environment, that may collaborate with a data orchestration system at a near edge, or core, environment, to enhance the accuracy, speed and cost-savings for multiple use cases, such as remote inspection and immersive experience sharing, for example.

At a device level, a portable image converter, which may be implemented in an edge computing device, may be deployed in an edge environment and may comprise a still camera and/or video camera for image capture, and/or user may access images and/or videos sourced from drones, AR (Augmented reality) goggles, a smartphone, or surrounding surveillance structures, for example. The scope of the invention is not limited to any particular form factor(s) for a portable image converter however, and the foregoing are provided only by way of example.

In an embodiment, a portable image converter may serve as a local compute engine for real time 2D to 3D rendering, and may further comprise a local storage for historical data, and one or more existing 3D models, in order to be able to deliver accurate and fast conclusions based on the outcome of a 2D-3D rendering process. Based on the comparison of a rendered 3D image with prior conditions, a green, yellow, or red, status may be indicated in a short period of time, possibly less than 10 seconds for example. The status indicator may serve as a guide to what further action(s), if any, are required based on the 3D image that has been rendered of the site.

At a system level, one or more 2D images of an initial, or other, condition of, for example, subjects such as a man-made structure such as a building, or a natural feature, such as a mountain, may be used to render a 3D model of the building or natural feature, possibly, but not necessarily, in real time, as a baseline dataset, that is, a 3D model. Additional 2D images may be collected over time to generate one or more additional 3D models that may then be compared with the baseline 3D model and/or with each other to detect conditions, changed conditions, and trends, in the subject for which the 2D images were captures. The condition and trend information may be used to inform progressive analytics and predictive maintenance based on changes observed over time. The repository of 3D models may significantly reduce the demand for computing power for onsite rendering as high resolution rendering may only be needed for the delta areas, that is, areas of particular interest, such as where changes are noted, and/or expected, to be occurring. This tiered computing approach may help to conserve energy and/or conserve the limited computing resources at the portable image converter. Embodiments may be employed in various enterprise, and consumer, use cases, and the use cases disclosed herein are solely for the purposes of illustration, and are not intended to limit the scope of the invention in any way.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of an embodiment of the invention is that 3D images of features of interest may be generated in real time as the 2D images used to generate the 3D image are captured. An embodiment may generate 3D images in environments with limited computing resources. An embodiment may provide structural and other information concerning physical environments that are difficult, or impossible, for a human to access. An embodiment may enable a content creator to share an immersive 3D experience using 2D images. Various other advantages of one or more embodiments of the invention will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Overview

In general, one or more embodiments of the invention may comprise one or more small form factor image conversion devices (SFFICDs), possibly operating in a far edge computing environment, that perform real time 2D to 3D rendering, and 3D model comparison, to support conclusions as to whether, and what, action(s) may need to be taken concerning the subject(s) from which the 3D model(s) were generated. These operations may be performed onsite where the subject is located. Such small form factor image conversion devices, which may be implemented as edge computing devices, may comprise autonomous vehicles such as drones and UAVs (unmanned autonomous vehicle), robots, semi-autonomous, or non-autonomous, vehicles controllable in whole or in part by way of human commands transmitted by way of a user interface (UI), portable computing devices such as tablets, smartphones, and laptops, and any other systems and devices, which may comprise hardware and/or software, that are configured to capture 2D images, which may comprise still and/or video, and to convert one or more of the 2D images, which may be digital and/or analog, to a portion of, or an entire, 3D digital model.

More generally, the scope of the invention is not limited to any particular image conversion device. Note further that an image conversion device may, or may not, also comprise an image capturing device such as a camera for example. In an embodiment, an image conversion device may omit an image capturing device, but may be configured to obtain images from image capturing devices that are located elsewhere, that is, other than at the image conversion device.

In one particular, and non-limiting example, an image conversion device may comprise a variety of components including, but not limited to: one or more cameras, and/or images captured by a drone, smart phone, infrared camera, or other image capturing devices; a 2D-to-3D rendering module; data storage; a comparison module, which may be optional, for example, in a consumer use case; a dataflow and output controller; a wireless communication connection and associated hardware and software, such as, for example, a WiFi connection, cellular connection, or satellite connection; a small graphical display; a speaker; a microphone; and, a file compressor.

An embodiment may further comprise a central system at near edge location/environment, or core location/environment, to host 2D images gathered by image conversion devices and/or other entities. The central system may also store 3D models, and original design files for regulatory compliance. In an embodiment, the central system may perform various functions, such as, but not limited to, to training AI/ML (artificial intelligence/machine learning) algorithms to predict changes with time, integrating with environmental sensor data to root cause the failure, issuing policy or protocols for emergency response, scheduling tasks for each target, and dispatching associated or required prior models, such as may be used as references, by one or more far edge devices, ahead of the tasks in order to reduce rendering time and energy, and fully enable, and employ, the real time compute and processing power of onsite devices, that is, the edge devices.

B. General Aspects of Some Example Embodiments

One or more embodiments may possess various useful features and advantages, examples of which are discussed hereafter. For example, a portable image converter according to an embodiment may provide accuracy, convenience, efficiency, and sustainability to daily jobs of many auditors and inspection engineers, by implementing 2D to 3D real time rendering at far edge. This approach may eliminate unnecessary physical travel of people to sites of interest, and may reduce or eliminate the need for movement of large amounts of data from the site to the core for processing. The scheduled rendering of 3D at an edge device may require relatively less compute power, as one or more 3D reference models may be pushed out to, or pulled by, the edge device, thus eliminating the need for the edge device to generate the reference models itself. For environments with large scale, real time, rendering needs, the use of 3D reference models may save significant computing resources, reduce rendering at the far edge, reduce required communication bandwidth between the edge and the core, and provide 3D models to the core relatively more quickly.

As another example, a portable image converter may provide millions of content creators the capability of sharing real time immersive experiences by linking physical and virtual worlds. The immersive experience may be shared with users.

In an embodiment, the automatic comparison of the real time rendered 3D model with the design files or prior reference models, which may be spatial or thermal for example, may provide quick insights as to aspects of a component or an area of the target that is out of specification. This information may be useful for designers, engineers, and maintenance personnel, regulation auditors, or quality assurance inspectors, for example.

In an embodiment, the ongoing accumulation of real world 3D models may be used to continuously update a model repository. The models in the model repository may be used for various purposes such as, for example, to monitor the health of the target, measure material behavior, predict trends assisted by AI/DL, detect anomalies, identify root cause(s) of an observed deformation or other anomaly, such as may be due to improper installation, defective materials, and/or unexpected environmental factors, and to alert stakeholders for early intervention to prevent catastrophic failures and/or for the taking of other actions.

Further, in an embodiment, the collaboration of one or more portable image converters with a central scheduling system may enable the automatic dispatch of the relevant prior, or reference, model(s) to the tasked devices to speed up rendering and comparison of 3D models by the device, and may thus eliminate any need for the device to search for, and obtain, the relevant 3D reference model(s). Thus, for example, a 3D reference model may be staged at a device before the 3D reference model is needed, so that comparisons with the 3D reference model may be performed immediately after a 3D model is generated by the device.

As a final example of features and aspects of an embodiment, a method according to one embodiment may comprise two operational modes, namely, a coarse mode with low resolution rendering, and fine mode with relatively higher resolution rendering than the coarse mode. In an embodiment, the coarse mode could be the primary, or default, mode to enable a relatively faster scan, that is, 2D image capture, than would be possible in the fine mode. Upon detection of an actual, or suspected, anomaly, which may be determined by 3D model comparison for example, the mode may automatically switch from coarse mode to fine mode to reveal more details about the anomaly and related aspects of the target. The operational modes of an embodiment may also comprise, or be integrated with, other techniques such as, for example, IR heatmap modeling techniques, to provide additional functionalities, such as determining a heat signature, and heat distribution, such as may be indicated by thermoclines, of a target.

C. Detailed Description

With reference now to FIG. 1, an example architecture 100 according to an embodiment is disclosed. In the example of FIG. 1, one or more small form factor image conversion devices (SFFICD) 102 may operate in a far edge computing environment, and may be configured and operable to perform real time 2D to 3D rendering, and also configured and operable to send/receive data to/from a central system 104 at near edge or core to perform large database, AI/DL training and various control functions as described elsewhere herein.

In one embodiment, the SFFICD 102 may comprise only minimal hardware components, such as a GPU 106 (graphics processing unit) for real time rendering—for example, the 3rd gen RTX chip can deliver real time neural rendering with a single GPU. A portable GPU may also be used to perform rendering at a remote location. In an embodiment, the SFFICD 102 may further comprise a memory card 108 for data storage, a DSP 110 (digital signal processor) or low power CPU 110 (central processing unit) for output controller processing and 3D model comparison, a wireless communication chipset 112 to support WiFi, cellular, satellite, or other wireless, connectivity. The SFFICD 102 may comprise various other components such as, but not limited to, a display 114, an acoustic alarm, and a camera 116.

Among other things, an embodiment of the SFFICD 102 may be configured and operable to generate or render, in real time, a 3D digital model from one or more 2D images, which may be digital. As well, the SFFICD 102 may be configured and operable to obtain 2D images with an onboard camera, and/or to obtain 2D images from an external source.

The SFFICD 102 may perform rendering of a 3D image, from one or more 2D images, in a variety of different ways. For example, an embodiment of the invention may employ Neural Radiation Field (NeRF), and may, in one example, be able to achieve real time view rendering at a speed of 5 fps (frames per second), with a digital resolution of up to 1575×861×1290 while maintaining a file size, in this example, of only 66 MB. Note that the resolution may be defined, for example, by a user, and both the FPS and file size will change with changes in the resolution. If accurate positioning of the camera is performed, more accurate and faster 3D reconstruction can be achieved. Some experimental results obtained by one embodiment are disclosed and discussed elsewhere herein. Using advanced deep learning techniques, for example, and embodiment may extend the 2D to 3D rendering to achieve various computer vision tasks, as well as 3D modeling acceleration.

The NeRF approach may be more accurate, in some instances at least, than the BIM file reconstruction of 3D space which only reflects structural accuracy from a design point of view, rather than reflecting real world condition such as a cracked surface, deformations, and deteriorated parts. Thus, an embodiment of the invention comprises an anomaly detector which is configured and operable to detect anomalies, such as cracks or deformed component parts of the buildings, to focus on the fine tuning on the region of interests. Note that an 'anomaly' as used herein is not limited merely to problematic conditions, but more broadly, embraces, among other things, a deviation from a normal, expected, or prior, condition. Thus, one embodiment of the invention may comprise a module for generating RGB based heat synthesis images based on environmental factors such as ambient temperature, and materials deployed, and then those heat synthesis images may be converted to 3D heatmaps to help identify areas at risk for fire, chemical reactions, and other problems.

With continued reference to FIG. 1, a central system 104 according to one embodiment may reside at a local office, or near edge location, or a datacenter/cloud where volume storage 118 may be available for hosting necessary historical data for comparison or compliance. The host site for the central system 104 may also comprise a pool 120 of GPUs and/or DPU (data processing unit) that is available for processes such as AI/ML/DL (deep learning) training, 3D model process optimization to reduce rendering and comparison time and compute power at far edge, root cause analysis and progress prediction. In an embodiment, the central system 104 may comprise a multi-core CPU 122 for dataflow control, task scheduler operations, relevant model dispatch operations, and decision making operations, such as operations based on policy and protocol. An embodiment may be configured to minimize, to various extents, the communication of data between the SFFICD 102 and the central system 104, in order to reduce network bandwidth burden, and latency, and to save energy at the SFFICD 102. Thus, an embodiment may be configured and operable to reduce the amount of data transferred between the SFFICD 102 and the central system 104.

Figure 2:
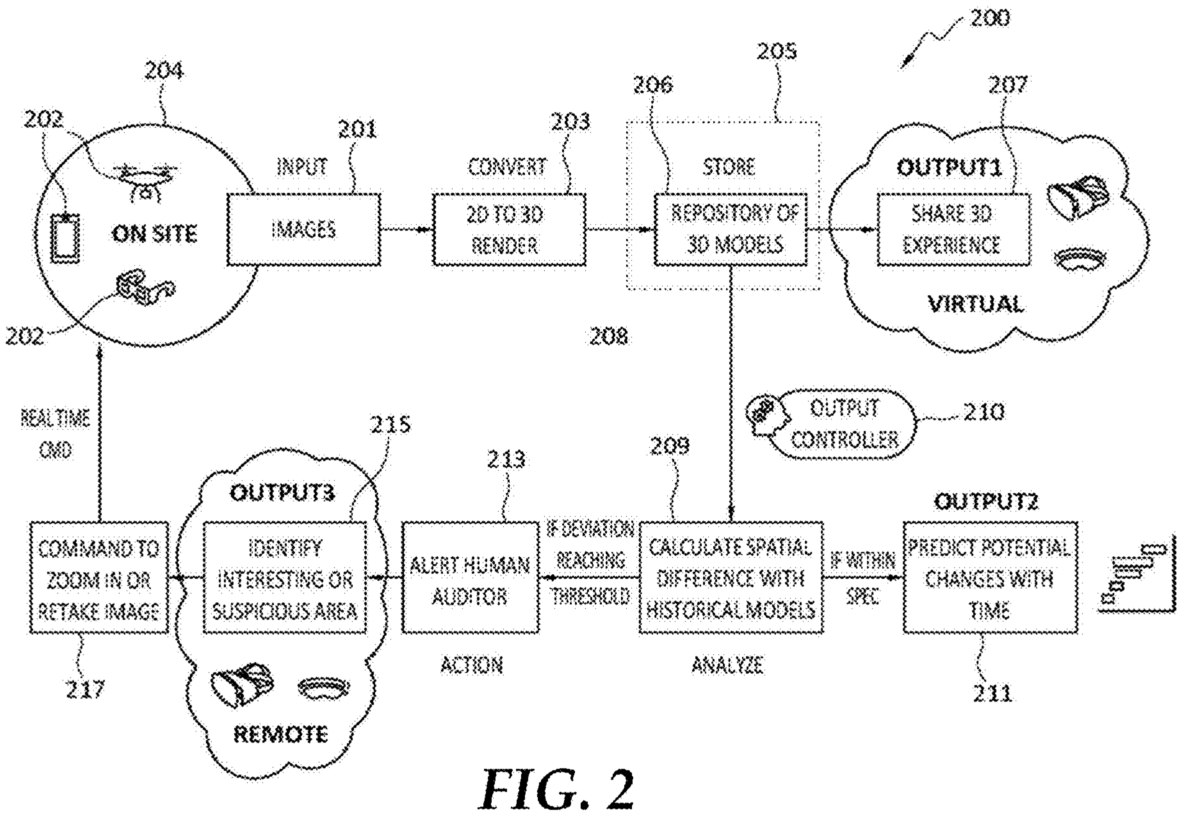
FIG. 2 discloses aspects of example method, including data flow processes, performed in an architecture, according to one embodiment.

With reference next to FIG. 2, details are provided concerning an example method 200, which may comprise various data flow operations, according to one embodiment. In the example of FIG. 2, various entities at various locations may be involved in one or more aspects of a data flow. Thus, a SFFICD 202 may operate at a remote site, or other edge location 204, to capture, or otherwise access, 2D images. As detailed below, these 2D images, however obtained, may be used to generate various outputs.

Initially, and as noted above, the SFFICD 202 may obtain 201 one or more 2D images, which may then be converted, by the SFFICD 202, in real time 203, to a 3D model of the target of the 2D images. Note that as used herein, a 'target' refers to a physical entity, man-made or otherwise, of which one or more 2D images are captured. The 3D model may then be stored 205, such as in a repository 206 of 3D models hosted by a central system 208. In an example consumer use case, the 3D model may be shared 207 with one or more users to enable the users, using VR (virtual reality) goggles and/or comparable equipment, to enjoy a virtual 3D experience, such as an experience of bungee jumping, or flying with a wingsuit, for example. Thus, this shared virtual experience is one example of an output that may be generated using the 3D model. The type of output to be produced, and the data flow for a particular output, may be controlled by an output controller 210 that is configured and operable to communicate with a central system and one or more SFFICDs 202. In an embodiment, the output controller 210 may be hosted by the central system 208, although that is not necessarily required.

In an embodiment, the method 200 may comprise comparing 209 one or more 3D models to each other to enable a calculation of, for example, one or more spatial, and/or other, physical differences between the subjects represented in the 3D models. Differences between the 3D models may be within spec, or acceptable limits, or not. In either case, the differences may be reported. The differences between the 3D models may be used to identify trends in various features of the target such as, for example, an increasing size of a crack in a steel beam. As an example of an output of an embodiment of the invention, such trends may be used to output a prediction 211 of potential changes in the feature over time.

If it is determined at 209 that a difference/delta between 3D models is nearing, has not reached, a defined threshold, an alert may be sent 213 to a human operator and/or other recipient, such as a computing system. Likewise, an alert may be sent if it is determined that the threshold has been exceeded. The alert may indicate, for example, the speed with which the difference is changing, whether the change in the difference has accelerated or not, the nature of the difference, the location of the difference, an extent to which a threshold has been exceeded, and one or more possible remedial actions that may be implemented to slow, stop, or reverse, the change in the difference. By way of illustration, a remedial action may be to weld a crack in a steel beam, while another remedial action may be to replace the steel beam. The remedial actions may, in one embodiment, be ranked in terms of variable such as, but not limited to, time to implement, cost to implement, and expected effective life of the target after the remedial action has been implemented. Where a threshold has been exceeded, the alert may indicate that that an affected structure, such as a bridge for example, should be immediately shut down until repairs can be made.

An alert may be analyzed by a human and/or by a computing system, to identify 215 a region of concern or interest (ROI). The identification 215 of the area of concern or interest is another example of an output that may generated by an embodiment of the invention. In an embodiment, the operations of the method 200 leading up to the identification 215 may be performed in real time so as to enable a user or operator to control, possibly remotely, the SFFICD 202 so that the SFFICD 202 can perform real time actions 217 such as zooming in on an area of interest, retaking a 2D image, and/or other actions. Thus, for example, an alert may indicate that a crack in a beam is growing in size and may not only indicate possible remedial actions, but may also indicate in real time to a human or other entity that additional 2D images may need to be gathered. Thus, alerts may serve as a basis for the performance of near term, and/or long term, actions relating to one or more 3D model differences.

It is noted that as costs for GPUs go down, and power consumption decreases, one or more embodiments may target a wide range of enterprise use cases for processes such as remote inspection and audit, to bring the convenience and efficiency to the daily jobs of many engineers. As another example, an embodiment may equip millions of content creators to bridge the physical and virtual world for better immersive experience.

Below are provided two aspects of experimental results to analyze the efficiency and visual quality of using 2D-to-3D methods: efficiency and visual reconstruction. In these experiments, NeRF was used as the baseline.

Figures 3, 4:
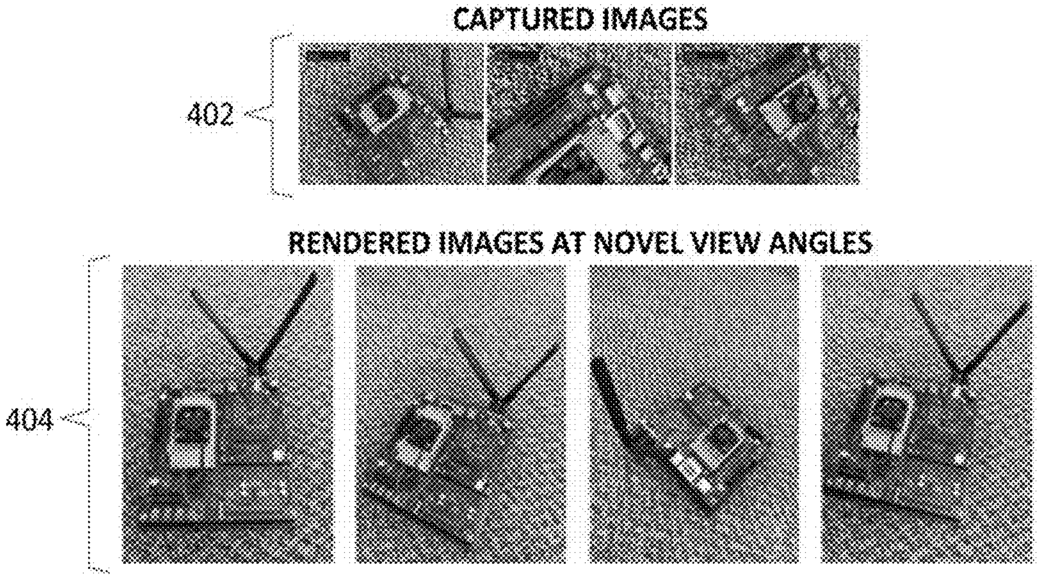
FIG. 3 discloses a table comparing the performance of various 2D-to-3D rendering models.
FIG. 4 discloses some example results from the use of Instant-NGP for 3D modeling.

With reference now to FIG. 3, to measure the efficiency of NeRF, a benchmark may be provided of different NeRF methods on 800×800 images in a synthetic 360 dataset. The results are shown in the Table 300. As a practical matter, humans require an application with frame per second (FPS) over 20. It can be seen in the table 300 that many NeRF variations, such as NeRF-SH, KiloNeRF, DIVeR32, FastNeRF, and SqueezeNeRF, can achieve very high FPS which indicate their real time computation ability. Given the fact that these approaches can render images up to 800×800 resolution, an embodiment may adaptively reduce the resolution to further speed up the computation, or alternatively may sacrifice speed for higher resolution. Thus, a tradeoff may be made between resolution and speed.

With reference now to FIG. 4, a cellphone was used to capture 30 images 402 of a circuit board. Then Instant-NGP was used to render the images 404 to reconstruct the 3D model. It can be seen in the images 404 that 2D-to-3D rendering is achievable once high-quality 2D images 402 are provided. From FIG. 4, it can be seen that given captured images 402, an embodiment may construct the 3D model of the circuit and render the novel view angles as shown at 404. Here, it can be seen that the details of circuit board are well captured, and may enable users to check the details of the electronic components in the 3D model. This approach may be applied to reconstruct other objects for users to explore different angles of views.

As noted earlier herein, embodiments of the invention may be employed in a variety of different use cases which may include, but are not limited to, enterprise use cases, and consumer use cases. Examples of each of these are set forth below.

Example enterprise use cases include, but are not limited to, remote inspection, auditing, quality control, and prediction operations. Industries and applications for these use cases may include industries involving physical infrastructure, such as construction, chemical plant, manufacture, oil, and mining. Some example physical infrastructures may include offshore and onshore oil rigs, tunnels, mines and other underground cites, bridges, railroad tracks, buildings, radio towers, cell towers, and electrical power transmission towers. More generally, any physical structure(s), whether man-made or otherwise, that may require or benefit from periodic inspects and audits, such as may be performed by inspectors on-site, or remotely with a UAV for example, may be a target for an embodiment of the invention.

For example, an embodiment may be used to evaluate structures such as bridges, railroad tracks, and pipe connections in chemical plants. An embodiment may enable 3D remote inspection to quickly examine targets at scale. Anyone at the site may use an embodiment of the invention to perform inspection, and would not necessarily be required to be a highly skilled auditor. Further, unmanned vehicles such as drones may be employed for dangerous and/or inaccessible locations, or locations that are cost-prohibitive to access. If all inspect results are in a 'green' status, approval for the structure that was inspected may be issued onsite, while captured image/video and a rendered 3D model may be uploaded to a central repository when a wired connection is available for a device such as an SFFICD to plug in. If an area of concern, such as an area with a 'yellow' or 'red' status, is identified through real time rendering and comparison, such as surface crack propagation, or chemical pipe leaking, an alert may be issued onsite to trigger additional actions such as requesting a remote auditor for expert review. A remote auditor may send instructions in seconds to direct a drone or on-site person to zoom in or view in a different angle to confirm the point(s) of interest. Meanwhile, an embodiment may additionally, or alternatively, alert an authority for emergency preparation according to a predefined policy or protocol. A wireless communication through WiFi, cellular, or satellite, may be particularly useful in enabling rapid communication between the site and other locations.

Example consumer use cases include, but are not limited to, remote immersive experience sharing. In particular, when a person is traveling to different places, the portable device can render the captured 2D images into 3D model in real time so as to enable the person to share a 3D rendering of his or her environment with family, friends or social network. Further, a viewer with VR goggle would have an immersive experience as if traveling with the experiencer. An embodiment may be employed by, for example, a professional photographer, stargazer, mountain climber, scuba diver, bungee jumper, to create their immersive studio to deliver a real time 3D broadcast to one or more customers or clients. A model compressing feature may be added to the image converter to reduce the network bandwidth requirement for live streaming. The device can be used either in real time or non-real time as many people have photos that they may wish to convert to 3D for immersive experience sharing.

Attention is directed now to various real world circumstances in which an embodiment of the invention may have proved to be useful.

Figure 5A:
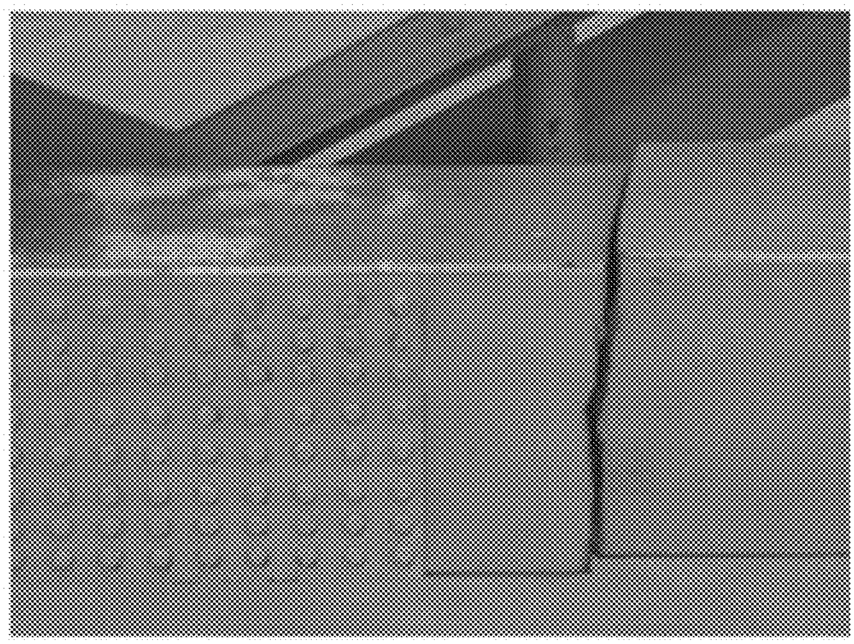
FIG. 5A shows a crack in a steel beam.
Figure 5B:
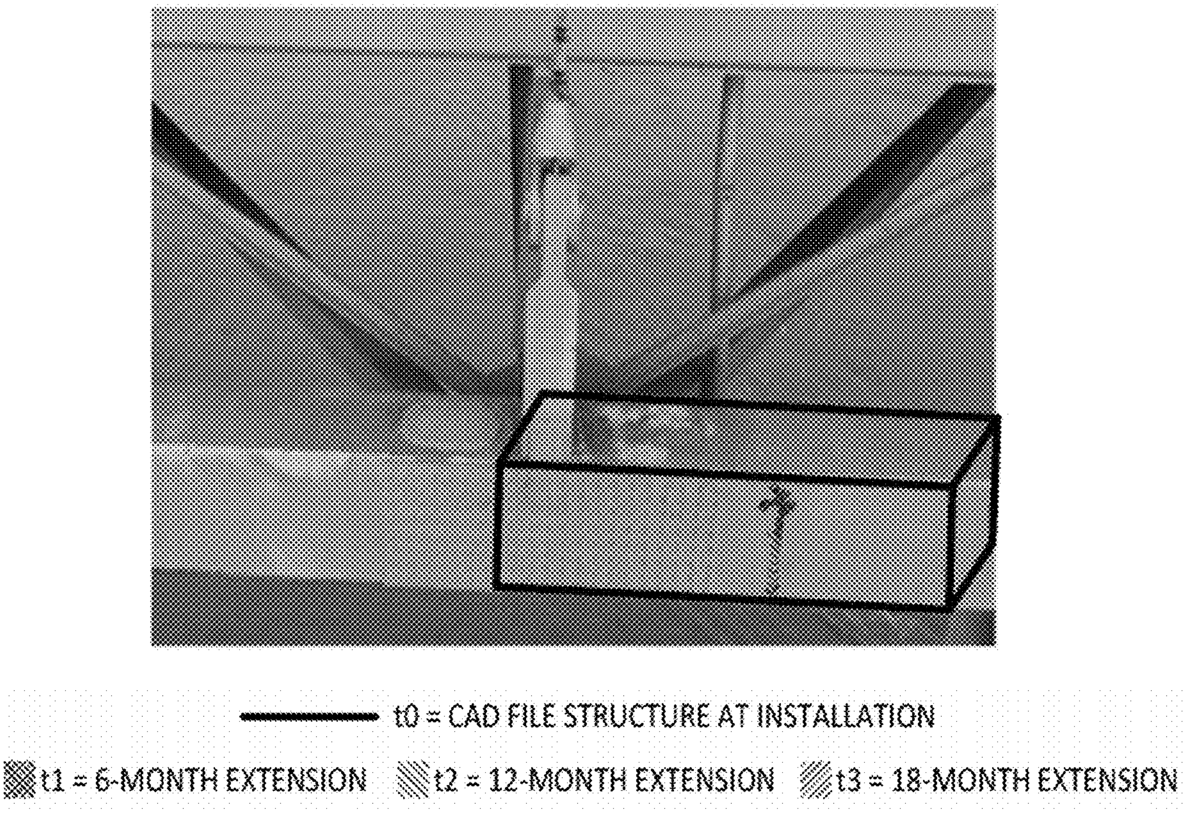
FIG. 5B discloses an example of how various 2D images may be captured of the structures in FIG. 5A.

With attention next to FIGS. 5A and 5B, an example of one possible use case for an embodiment of the invention concerns a Mississippi River bridge beam crack (FIG. 5A). The crack in a steel beam forced an emergency three-month shutdown of an Interstate-40 bridge across the Mississippi River in 2021. An embodiment may help to prevent significant service interruptions such as this, thereby possibly saving significant expense, when operations such as those indicated below are performed:

[1] 2D images taken periodically by drone (FIG. 5B) at various times t0, t1, t2, t3;

[2] nearby image converter renders the image to 3D model using technologies such as SfM (Structure from Motion), or NeRF (Neural Radiation Field);

[3] the real time rendered 3D model may be compared with the original design in CAD file or the image of installation—each follow-on inspection may be compared with prior 3D models rendered from periodical inspection results, and stored in a model repository;

[4] the automatic spatial comparison by the image converter provides quick insights on the real condition of the target without the auditor being onsite;

[5] if the comparison result points to an anomaly, or the deviation reaching a pre-set threshold, the system may automatically alert a human auditor and/or computing system to look at 3D models overlay closely to send commands to remotely direct the drone, or other image capturing system/device, to position a camera to take additional images or zoom in to confirm the severity; and

[6] using AI/ML, the changes of the target along a timeline may be used to help identify a root cause of the observed deformation/failure, to predict progression of the deformation/failure if appropriate action is not taken, and to predict when maintenance or other action should be performed to slow, stop, or reverse, the observed condition.

Figure 6:
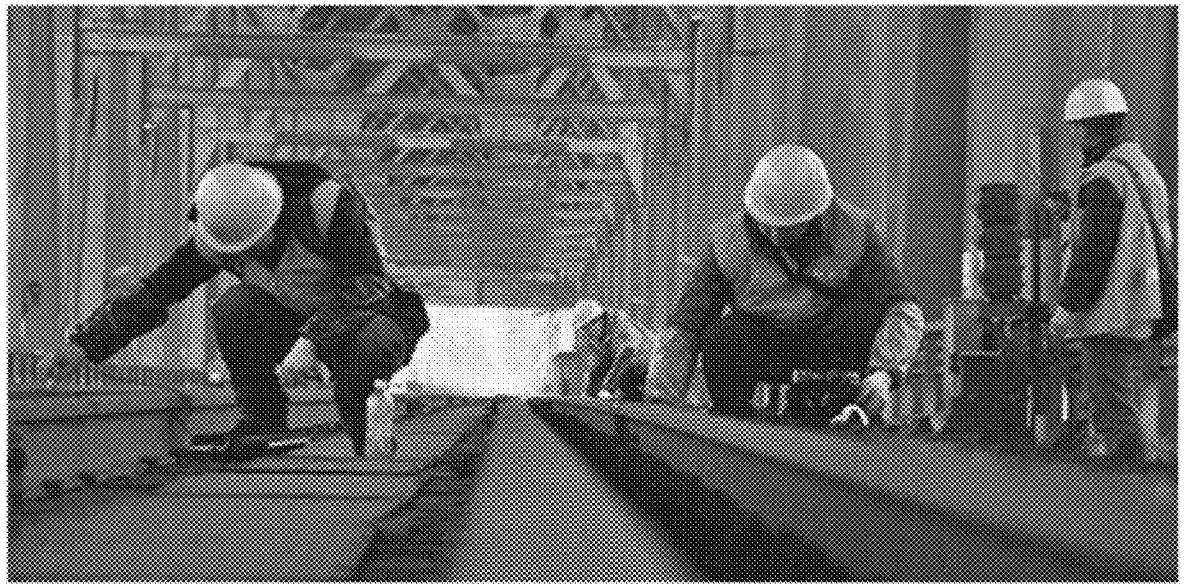
FIG. 6 shows one possible use case for an embodiment.

With reference next to FIG. 6, it is noted that a recent heatwave in the UK created a number of emergencies with respect to commuter trains. Particularly, because the steel of the rail track was stress tested at 31° C., while the heatwave caused the local temperature of some tracks to rise as high as 62° C., the track became warped in some locations.

In an embodiment, a group of drones, rather than human inspectors, could survey the track and send photos through wireless connection, while a human in a nearby vehicle with as SFFICD could inspect 3D rendered models in real time and compare those 3D models with a CAD model, or the most recent normal inspection results, to determine the severity of the local deformation, and alert the transportation system authorities as to remedial actions that may be taken, where examples of such remedial action may include, but are not limited to:

[1] spray water to cool off the slightly warped track, thus possibly allowing the trains to continue to operation, although possibly at lower speeds—and announce commute delays to the public; and/or

[2] stop the trains in areas where the track is warped to the point of being unable to be safely used, and announce the cancellation of affected trains/routes—also, advise the public as to alternative transportation options such as bus, rideshare, or taxi, for example.

In these example circumstances, an embodiment of the invention may provide relatively fast 2D image acquisition, and initial 3D rendering in low resolution, to deliver anomaly detection in as short a time as a few seconds. This may enable engineers and other personnel to use high resolution rendering to focus only on affected areas, and then quickly identify corrective action to be taken. Such an approach may reduce the likelihood of an accident, while also improving the user experience. Then, when the human inspector returns to a near edge site, such as an office for example, the 3D files from the SFFICD may be uploaded to a central repository and may be used to update the 3D model for the target. The updated 3D model may then be distributed to all SFFICD for use in a subsequent inspection operation.

Figure 7A:
FIG. 7A shows a building prior to collapse.
Figure 7B:
FIG. 7B shows the building of FIG. 7A after collapse.

With reference next to FIGS. 7A and 7B, it is noted that, in June 2021, Champlain Towers South, a 12-story beach-front condominium in Miami, FL collapsed due, it is believed, to a long-term degradation of reinforced concrete structural support, and 99 deaths were attributed to the collapse. FIG. 7A is a picture of the building prior to collapse, in 2015, and FIG. 7B is a picture of the building after it collapsed in 2021. These circumstances suggest another possible use case for an embodiment of the invention.

Particularly, an SFFICD may be used by an inspector to create a 3D model of current conditions, based on recent 2D images of the target, and to compare the new 3D model with previously rendered 3D models of various structures, such as the basement, parking garage, and pool deck. Delta analytics, comprising differences between the new, and previously created, 3D models may then be used by AI/ML techniques, for example, to identify areas classified as 'green,' 'yellow,' or 'red,' as well as to make predictions as to when, for example, a structure might be expected to fail. All of these operations may be performed in real time as an inspector is performing an inspection of the structures. The analytics and predictions may be used to identify remedial actions, such as steel/concrete replacement or reinforcement that should be taken before any significant problems occur.

It is noted with respect to the disclosed methods, including the example method of FIG. 2, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Figure 8:
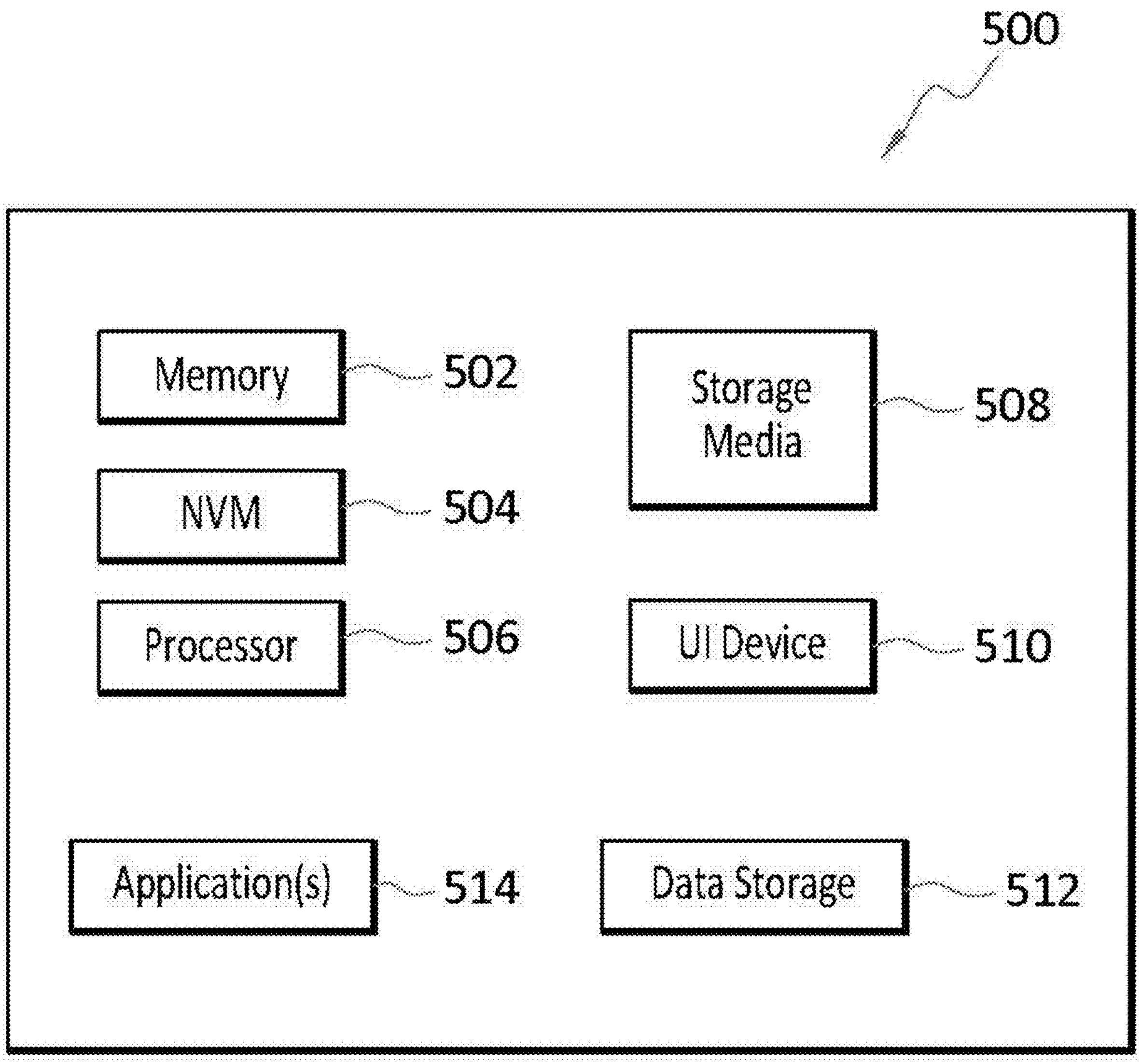
FIG. 8 discloses aspects of an example computing device configured and operable to perform any of the disclosed methods, processes, and operations.

With reference briefly now to FIG. 8, any one or more of the entities disclosed, or implied, by FIGS. 1-7, and/or elsewhere herein, may take the form of, or include, or be implemented on, or hosted by, a physical computing device, one example of which is denoted at 500. As well, where any of the aforementioned elements comprise or consist of a virtual machine (VM), that VM may constitute a virtualization of any combination of the physical components disclosed in FIG. 8.

In the example of FIG. 8, the physical computing device 500 includes a memory 502 which may include one, some, or all, of random access memory (RAM), non-volatile memory (NVM) 504 such as NVRAM for example, read-only memory (ROM), and persistent memory, one or more hardware processors 506, non-transitory storage media 508, UI device 510, and data storage 512. One or more of the memory components 502 of the physical computing device 500 may take the form of solid state device (SSD) storage. As well, one or more applications 514 may be provided that comprise instructions executable by one or more hardware processors 506 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

Figure 9:
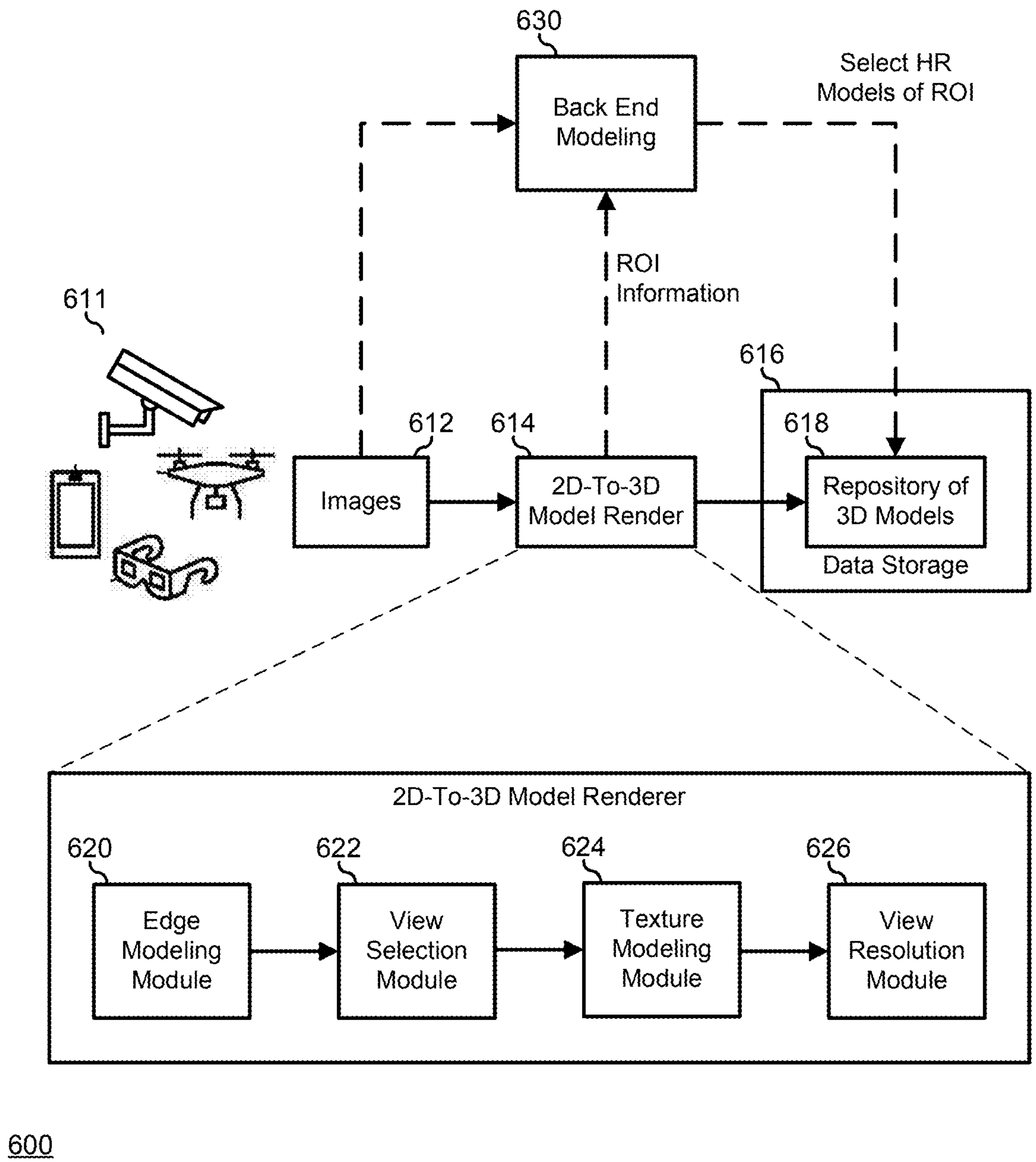
FIG. 9 illustrates a small form factor image conversion devices (SFFICD), according to an embodiment.

With reference now to FIG. 9, a SFFICD 600 is illustrated that provides various data flow operations which may be similar to the method described with respect to FIG. 2, above. SFFICD 600 includes one or more image capture devices 611 that provide 2D images 612, a 2D-to-3D renderer 614, and a data storage device 616. SFFICD 600 may be similar to SFFICD 102 and SFFICD 202, as described above. As such, SFFICD 600 is configured to receive one or more 2D images 612 and to render in real time a 3D digital model from the 2D images by a 2D-to-3D renderer 614. As such, SFFICD 600 may be configured to obtain 2D images 612 from an onboard camera, to obtain 2D images from an external source, or from both an onboard camera and an external source, as needed or desired. An example of SFFICD 600 may include a still or video camera in a mobile device, such as a smartphone, a drone, a pair of AR goggles, or the like. Another example of SFFICD 600 may further include a still or video camera in a fixed device, such as a closed-circuit television (CCT) device, a surveillance camera, or the like. The rendering of 2D image 612 into a real time 3D digital model by renderer 614 may be provided in accordance with any of the embodiments as described above, as needed or desired. Data storage device 616 may be similar to the storage 205 as described above. Storage device 616 includes an image repository 618 similar to repository 206 as described above. In particular, image repository 618 may store one or more simplified 3D models of a particular man-made structure or natural feature to provide a template for the rendering of real time 3D model by renderer 614 from 2D image 612, as described above, and as further described below.

It will be understood that mobile and remote 2D-to-3D processing can provide users with flexibility and freedom to provide on-the-spot field checking and monitoring of sites of interest, real-time interactive media experiences, or the like. In order to apply such 2D-to-3D rendering in motile and remote environments, the rendering functions need to be transplanted from centralized processing centers into far edge devices like mobile phones, laptops, and other edge computing platforms. Thus it may be desirable to design lightweight 2D-to-3D modelers that can run in real time with limited computation power. Moreover, given the changing nature of network connections, such modelers may need to be tolerant of network interruptions.

It has been understood by the inventors of the current disclosure that Neural Radiant Field (NeRF) rendering provides an automatic solution to use 2D images to construct 3D models of objects. In particular, utilizing advanced GPU acceleration (e.g., NVIDIA RTX 3090 or the like), the rendering process can be done in as little as five (5) minutes. However, current NeRF based approaches are not typically configurable to operate on mobile embedded systems. In order to ensure the real-time optimization, we propose a 2-stage Neural Rendering (2s-NR) that can distribute the heavy computation into two separate stages: 1) edge modeling and 2) texture modeling.

Renderer 614 provides real time light-weight rendering of 2D images 612 into 3D models of the imaged objects. In particular, Renderer 614 splits the rendering process that may normally be associated with NeRF rendering into smaller, limited, and more easily processed tasks. As such, renderer 614 is shown in greater detail as including an edge modeling module 620, a view selection module 622, a texture modeling module 624, and a view resolution module 626. Edge modeling module 620 operates to utilize a local NeRF renderer to learn a 3D structural model of the object from the real photos. The 3D structural model of the object is modeled as a 3D binary edge map where only the contours and the edges of the object are reconstructed, and the rest regions are ignored. Mathematically, we can define the 3D edge reconstruction as a minimization of the binary cross entropy:

$$L=\sum\nolimits_{r\in R}\|C(r)\cdot\log[\alpha(\tilde{C}(r))]+(1-C(r))\cdot\log[1-\alpha(\tilde{C}(r))]\|^2, \quad \text{Equation 1}$$

where R is the set of rays in each batch if images, $\alpha[\tilde{C}(r)]$ and C(r) are the predicted and ground truth RGB (red, green, blue) colors for ray r, and $\alpha$ is the sigmoid function to map the binary value (i.e., to zero (0) or one (1) [0,1]). Such edge modeling as performed by edge modeling module 620 requires less processing resources than a full 2D-to-3D rendering, and so may be easily performed on mobile devices at the far edge of a network infrastructure.

After the 3D structural model is provided by edge modeling module 620, texture modeling module 624 fine tunes the edge map into a photo-realistic RGB image. That is, the missing textures are added to the edge map. Here, computational effort can be further reduced by limiting the rendering to a few particular Region of Interest (ROI), that is, a small number of selected views. View selection module 622 operates to select the ROIs. Texture modeling module 624 then recalculates the binary cross entropy:

$$L=\sum\nolimits_{r\in R}\|C(r)-f_\theta[r,E(r)]\|^2, \quad \text{Equation 2}$$

where $f_\theta$ is the mapping function with learnable parameters $\theta$ that takes both camera ray r and edge map E(r) to learn the color information.

After the 3D structural model is textured by texture modeling module 624, the user can view the 3D structural model in real time. And particularly, such 2D-to3D rendering by renderer 614 can be performed utilizing the limited processing resources typical of a mobile device on a far edge of the network infrastructure. However, the 3D structural model as rendered by renderer 614 may typically be provided in a low resolution format, such as 480P, and such a low resolution may be perfectly adequate to the needs of the typical mobile device, such as a laptop computer, a tablet device, a cell phone, or the like, because such devices typically have smaller display screens. However, it may be desirable to have real time 2D-to-3D renders that are viewable in larger resolution formats. For example, the user of the mobile device may desire to zoom in to selected features of the 3D structural model.

Here, SFFICD 600 is shown as being connected to a back end modeling module 630 that has greater processing capacity than the SFFICD, and that can perform near real time rendering of images 612. In this regard, back end modeling module 630 operates to receive the ROI information from view resolution module 626, and renders only those views as are selected as being ROIs. Thus the back end processing of the ROIs can be more quickly rendered by back end modeling module 630, without the necessity to fully render the 3D structural model. Further, view resolution module 626 operates to provide a selected resolution for back end modeling module 630 to render to, thereby further limiting the processing demands and consequently permitting the back end modeling module to render the desired views at the desired resolution more quickly.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed:

1. An image conversion device, comprising:

a hardware image capture device configured to capture a plurality of two-dimensional (2D) images; and a hardware renderer configured to receive the 2D images and to render a three-dimensional (3D) model of an object captured in the 2D images, wherein in rendering the 3D model, the hardware renderer first renders a binary edge map of the object, and next models textures for the 3D model;

wherein in rendering the binary edge map, the hardware renderer minimizes a cross entropy (L) from the 2D images as:

$$L=\sum\nolimits_{r\in R}\|C(r)\cdot\log[\alpha(\tilde{C}(r))]+(1-C(r))\cdot\log[1-\alpha[\tilde{C}(r)]]\|^2,$$

where R is a set of rays in each batch of 2D images, $\alpha[\tilde{C}(r)]$ and C(r) are predicted and ground truth RGB (red, green, blue) colors for ray r, and α is a sigmoid function to map a binary value (i.e., to zero (0) or one (1) [0,1]).

2. The image conversion device of claim 1, wherein the binary edge map includes contours and edges of the object.

3. The image conversion device of claim 1, wherein, in modeling the textures for the 3D model, the hardware renderer further recalculates the binary cross entropy (L).

4. The image conversion device of claim 3, wherein, in recalculating the binary cross entropy (L), the hardware renderer recalculates the binary cross entropy as:

$L=\rho_{r\in R}\|C(r)-f_\theta[r,E(r)]\|^2$, where $f_\theta$ is a mapping function with learnable parameters θ that takes both camera ray r and edge map E(r) to learn color information.

5. The image conversion device of claim 1, wherein, in modeling the textures for the 3D model, the hardware renderer further recalculates the binary cross entropy (L).

6. The image conversion device of claim 5, wherein, in recalculating the binary cross entropy (L), the hardware renderer recalculates the binary cross entropy as:

$L=\rho_{r\in R}\|C(r)-f_\theta[r,E(r)]\|^2$, where $f_\theta$ is a mapping function with learnable parameters θ that takes both camera ray r and edge map E(r) to learn color information.

7. The image conversion device of claim 1, wherein, in modeling the textures for the 3D model, the hardware renderer further selects at least one Region of Interest for the object.

8. The image conversion device of claim 1, further comprising:

a data storage device including a repository to store the 3D model.

9. A method, comprising:

providing, in an image conversion device, an image capture device;

capturing, by the image capture device, a plurality of two-dimensional (2D) images;

providing, in the image conversion device, a renderer;

receiving, by the renderer, the 2D images; and rendering, by the renderer, a three-dimensional (3D) model of an object captured in the 2D images;

wherein in rendering the 3D model, the renderer first renders a binary edge map of the object, and next models textures for the 3D model and in rendering the binary edge map, the renderer minimizes a binary cross entropy (L) from the 2D images as:

$$L=\sum_{r\in R}\left\|C(r)\cdot\log\left[\alpha\left(\tilde{C}(r)\right)\right]+(1-C(r))\cdot\log\left[1-\alpha\left[\tilde{C}(r)\right]\right]\right\|^2,$$

where R is a set of rays in each batch of images, $\alpha[\tilde{C}(r)]$ and C(r) are predicted and ground truth RGB (red, green, blue) colors for ray r, and α is a sigmoid function to map a binary value (i.e., to zero (0) or one (1) [0,1]).

10. The method of claim 9, wherein the binary edge map includes contours and edges of the object.

11. The method of claim 9, wherein, in modeling the textures for the 3D model, the renderer further recalculates the binary cross entropy (L).

12. The method of claim 11, wherein, in recalculating the binary cross entropy (L), the renderer recalculates the binary cross entropy as:

$L=\rho_{r\in R}\|C(r)-f_\theta[r,E(r)]\|^2$, where $f_\theta$ is a mapping function with learnable parameters θ that takes both camera ray r and edge map E(r) to learn color information.

13. The method of claim 9, wherein, in modeling the textures for the 3D model, the renderer further recalculates the binary cross entropy (L).

14. The method of claim 13, wherein, in recalculating the binary cross entropy (L), the renderer recalculates the binary cross entropy as:

$L=\rho_{r\in R}\|C(r)-f_\theta[r,E(r)]\|^2$, where $f_\theta$ is a mapping function with learnable parameters θ that takes both camera ray r and edge map E(r) to learn color information.

15. The method of claim 9, wherein, in modeling the textures for the 3D model, the renderer further selects at least one Region of Interest for the object.

16. An image conversion device, comprising:

a hardware image capture device configured to capture a plurality of two-dimensional (2D) images;

a hardware renderer configured to receive the 2D images and to render a three-dimensional (3D) model of an object captured in the 2D images, wherein in rendering the 3D model, the hardware renderer first renders a binary edge map of the object, and next models textures for the 3D model; and a hardware data storage device including a repository to store the 3D model;

wherein in rendering the binary edge map, the hardware renderer minimizes a cross entropy (L) from the 2D images, and in modeling the textures for the 3D model, the hardware renderer further recalculates the binary cross entropy (L) as:

$$L=\sum_{r\in R}\left\|C(r)\cdot\log\left[\alpha\left(\tilde{C}(r)\right)\right]+(1-C(r))\cdot\log\left[1-\alpha\left[\tilde{C}(r)\right]\right]\right\|^2,$$

where R is a set of rays in each batch of 2D images, $\alpha[\tilde{C}(r)]$ and C(r) are predicted and ground truth RGB (red, green, blue) colors for ray r, and α is a sigmoid function to map a binary value (i.e., to zero (0) or one (1) [0,1]).

* * * * *